(12) United States Patent  
Chang et al.

(10) Patent No.: US 9,388,050 B2
(45) Date of Patent: Jul. 12, 2016

(54) PRODUCTION METHOD FOR A GRAPHENE THIN FILM

(75) Inventors: Suk Tai Chang, Seoul (KR); Yeongun Ko, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 50 days.

(21) Appl. No.: 14/345,979

(22) PCT Filed: Sep. 29, 2011

(86) PCT No.: PCT/KR2011/007189
§ 371 (c)(1),
(2), (4) Date: Mar. 20, 2014

(87) PCT Pub. No.: WO2013/042819
PCT Pub. Date: Mar. 28, 2013

(65) Prior Publication Data
US 2014/0227164 A1  Aug. 14, 2014

(30) Foreign Application Priority Data
Sep. 23, 2011   (KR) .................. 10-2011-0096441

(51) Int. Cl.
*C01B 31/04* (2006.01)
*C01B 31/00* (2006.01)
(Continued)

(52) U.S. Cl.
CPC .............. *C01B 31/0446* (2013.01); *B82Y 30/00* (2013.01); *B82Y 40/00* (2013.01); *C01B 31/00* (2013.01); *C01B 31/0476* (2013.01); *C01B 2204/22* (2013.01)

(58) Field of Classification Search
CPC .... C01B 31/02; C01B 31/04; C01B 31/0438; B05D 3/02; B03D 5/00; B29C 39/00; H01B 5/14; H01B 13/00; H01L 21/28; B32B 9/04
USPC .......... 252/378 R; 423/445 B, 460; 977/742, 977/748
See application file for complete search history.

(56) References Cited

U.S. PATENT DOCUMENTS

2009/0056991 A1* 3/2009 Kuhr et al. ..................... 174/256
2009/0146111 A1* 6/2009 Shin et al. ...................... 252/510
(Continued)

FOREIGN PATENT DOCUMENTS

KR   10-2009-0059871 A   6/2009
KR   10-2011-0016287 A   2/2011
KR   10-2011-0068881 A   6/2011

OTHER PUBLICATIONS

Gilje, Scott, et al. "A chemical route to graphene for device applications." Nano letters 7.11 (2007): 3394-3398.*

(Continued)

*Primary Examiner* — Richard M Rump
(74) *Attorney, Agent, or Firm* — Hammer & Associates, P.C.

(57) ABSTRACT

The present invention relates to a production method for graphene thin film. The production method for graphene thin film according to the present invention can produce a graphene thin film by using a reciprocating linear motion device to put a deposition plate into reciprocating linear motion and apply a graphene oxide solution onto a substrate, while the deposition plate is connected to the reciprocating linear motion device and in contact with the substrate.

7 Claims, 5 Drawing Sheets

(51) Int. Cl.
    *B82Y 30/00* (2011.01)
    *B82Y 40/00* (2011.01)

(56) References Cited

U.S. PATENT DOCUMENTS

2010/0239869 A1    9/2010   Huang et al.
2011/0143107 A1*   6/2011   Steinig-Nowakowski
                            et al. .............................. 428/196

OTHER PUBLICATIONS

"ProEdge Doctor Blades". Kadant. © 2010 <http://www.kadant.com/files/5113/8746/5791/ProEdge_BL_1001.pdf> Accessed Sep. 25, 2014.*
In Kyu Moon, et al., "Reduced graphene oxide by chemical graphitization," Nature Communications, (vol. 1), (Article No. 73), (Sep. 21, 2010).

* cited by examiner

Reciprocating coating frequency (times)

Graphene oxide solution concentration (mg/mℓ)

PRODUCTION METHOD FOR A GRAPHENE THIN FILM

CROSS-REFERENCE TO RELATED APPLICATION

This application claims priority to and the benefit of Korean Patent Application No. 10-2011-0096441, filed Sep. 23, 2011, the disclosure of which is incorporated herein by reference in its entirety.

TECHNICAL FIELD

The present invention relates to a production method for graphene thin film.

BACKGROUND ART

Graphene is a two-dimensional novel material composed of a single layer of $sp^2$-hybridized carbon atoms in a honeycomb lattice. Graphene is known as a good conductor that is very stable structurally and chemically and carries electrons approximately 100 times faster than silicone and approximately 100 times higher current than copper does. Further, graphene is approximately 200 times stronger in mechanical strength and more flexible than steel and has a heat conductivity of about 5,300 W/m·K and a good optical property such as a light transmittance of 97.7%. Composed of carbon atoms alone, graphene has a vast specific surface area of 2,600 $m^2$/g. Such characteristics of graphene enables the use of graphene for transparent electrodes, touch panels, flexible displays, high-sensitivity sensors, catalysts, and so forth and advantageously allows graphene in combination with another material to form a composite material. In recent years, graphene has emerged as a promising second-generation semiconductor material.

Currently, there are three different production methods for graphene: the mechanical exfoliation method, the chemical vapor deposition (CVD) growth, and the chemical exfoliation method. Depending on the production methods, graphenes have different properties and hence different applications. The mechanical exfoliation method is a method of using a mechanical force to exfoliate graphite as a base material of graphene into graphene flakes. The mechanical exfoliation method that uses a scotch tape to produce graphene flakes has been a great contribution to the early studies on graphene. The graphene produced by the mechanical exfoliation method is of a relatively high quality but disadvantageous in regards to poor applicability and difficulty of production on a large scale. The CVD growth makes the use of the fact that a metal catalyst such as of nickel or copper is capable of adsorbing carbon atoms at high temperature. Thus, the CVD growth is a method of exposing graphene to a metal catalyst and a methane/hydrogen gas mixture at high temperature of 1,000° C. to have carbon melt on the surface of the metal catalyst and then cooling down to crystallize the carbon atoms on the surface of the metal catalyst. The graphene produced by the CVD growth is of a high quality but needs to control the conditions, such as the type and thickness of the metal catalyst, the reaction time, the cooling rate, the concentration of the reaction gas, etc. Further, the fabrication of CVD-grown graphene thin film requires an additional process of transferring the produced graphene to a desired substrate. Most of all, the high-temperature condition of the process such as 1,000° C. is a huge obstacle to the industrial use of the CVD growth. The chemical exfoliation method is a method of using an oxidizing agent or a surfactant to chemically exfoliate graphite in a solution state into graphene flakes. The oxidized graphene flakes produced with an oxidizing agent can return to the graphene with a reducing agent such as hydrazine, etc. The chemical exfoliation method has a disadvantage that the graphene oxide flakes separated by oxidization are not completely reduced to remain many defects, ending up deteriorating the electrical properties of the graphene. But, the chemical exfoliation method involves relatively soft conditions, has easiness of graphene production on large scale and allows production of graphene into various structures such as graphene-based hydrogel particles or graphene paper as well as graphene thin film. Further, the graphene produced by the chemical exfoliation method is easy to form a composite with another material and uniquely distinctive from the other graphene production methods in the aspect of applicability. Therefore, many studies have been made to extend the fields of the applications of graphene using the chemical exfoliation method.

The most important technique required to use the graphene oxides produced by the chemical exfoliation method for such applications as transparent electrodes, touch panels, flexible displays, high-sensitivity sensors, etc. is to uniformly apply the graphene oxides existing in the solution state on a desired substrate.

Conventionally, the graphene oxide flakes in the solution state are fabricated in the form of film through various coating methods and self-assembling methods, such as spin coating, spray coating, vacuum filtration, Langmuir-Blodgett (LB) assembly, layer-by-layer (LBL) assembly, etc.

The spin coating is the most widely used coating method, where a predetermined amount of a graphene oxide solution is put dropwise on a substrate, which is rotated at high spinning rate to coat the substrate by the centrifugal force imposed on the solution. In the case of the spin coating, an extremely high spin speed causes a failure to combine the graphene oxide flakes closely together and thus deteriorates the quality of the film on the whole; whereas an extremely low spinning rate ends up with the film too thick to acquire a uniform coating, making the film difficult to use as a transparent electrode. Further, the spin coating has the difficulty in acquiring a uniform coating on a large-area substrate.

The spray coating, which is a coating method to spray a graphene oxide solution on a substrate, makes it easy to get a coating on a large-area substrate and involves a process fast and simple. But, the spray coating causes graphene oxide flakes to aggregate before the solution sprayed reaches the substrate, ending up producing a film not uniform in the whole area.

The vacuum filtration is a coating method to pass a graphene oxide solution through a fine filter paper and filter graphene oxide flakes out, forming a film with the graphene oxide flakes. The vacuum filtration makes it possible to obtain a uniformly coated film and easy to control the thickness of the film, but it consumes a large amount of the graphene oxide solution and takes a long time for the process. More disadvantageously, the vacuum filtration requires an additional process to transfer the film formed on the fine filter paper to a desired substrate.

The Langmuir-Blodgett (LB) assembly is a coating method to immerse a substrate vertically in a solution having graphene oxide flakes arranged on the surface and then slowly lift it at a constant rate so that the graphene oxide flakes can self-assemble on the substrate. The LB assembly forms a relatively uniform film but takes a long time for the process, with the difficulty to form a coating on a large-area substrate.

The lay-by-lay (LBL) assembly is a coating method to apply different surface charges on the graphene flakes and assemble a film using the static attraction. For the LBL assembly, functional groups are affixed to the graphene flakes to prepare a graphene oxide solution having the positive electric charge and a graphene oxide solution having the negative electric charge, and the substrate is immersed alternately in the two solutions to build up the graphene oxide flakes in a lay-by-lay manner. The LBL assembly offers good workability, but it needs a pretreatment process for affixing functional groups to the graphene flakes, uses a great amount of the graphene oxide solution and takes too much time.

Accordingly, in order to overcome the problems with the conventional coating methods for fabricating a graphene thin film using graphene oxides prepared by the chemical exfoliation method, there is a demand for a novel production method for graphene thin film that can fabricate a uniform and large-area graphene thin film for transparent electrode using a small amount of a graphene oxide solution in a short process time without limiting the area of the substrate.

DISCLOSURE OF INVENTION

It is therefore an object of the present invention to provide a production method for graphene thin film that enables to fabricate a uniform and large-area graphene thin film in a short process, and a transparent electrode including the graphene thin film prepared by the production method.

In an attempt to achieve the object of the present invention, there is provided a production method for graphene thin film that includes: (a) injecting a graphene oxide solution in the direction of an obtuse or acute angle between a substrate placed in parallel with a reciprocating linear motion device and a deposition plate connected to the reciprocating linear motion device and in contact with the substrate; and (b) using the reciprocating linear motion device to put the deposition plate connected to the reciprocating linear motion device into reciprocating linear motion while the deposition plate is in contact with the substrate, thereby applying the graphene oxide solution onto the substrate.

In an attempt to achieve the object of the present invention, there is also provided a transparent electrode that includes the graphene thin film produced by the production method for graphene thin film according to the present invention.

The production method for graphene thin film according to the present invention can prepare a uniform and large-area graphene thin film for transparent electrode using a small amount of a graphene oxide solution in a short process time without limiting the area of the substrate.

DETAILED DESCRIPTION OF THE INVENTION

The present invention is directed to a production method for graphene thin film that includes: (a) injecting a graphene oxide solution in the direction of an obtuse or acute angle between a substrate placed in parallel with a reciprocating linear motion device and a deposition plate connected to the reciprocating linear motion device and in contact with the substrate; and (b) using the reciprocating linear motion device to put the deposition plate connected to the reciprocating linear motion device into reciprocating linear motion while the deposition plate is in contact with the substrate, thereby applying the graphene oxide solution onto the substrate.

Hereinafter, a detailed description will be given as to a production method for graphene thin film according to the present invention.

Figure 1:
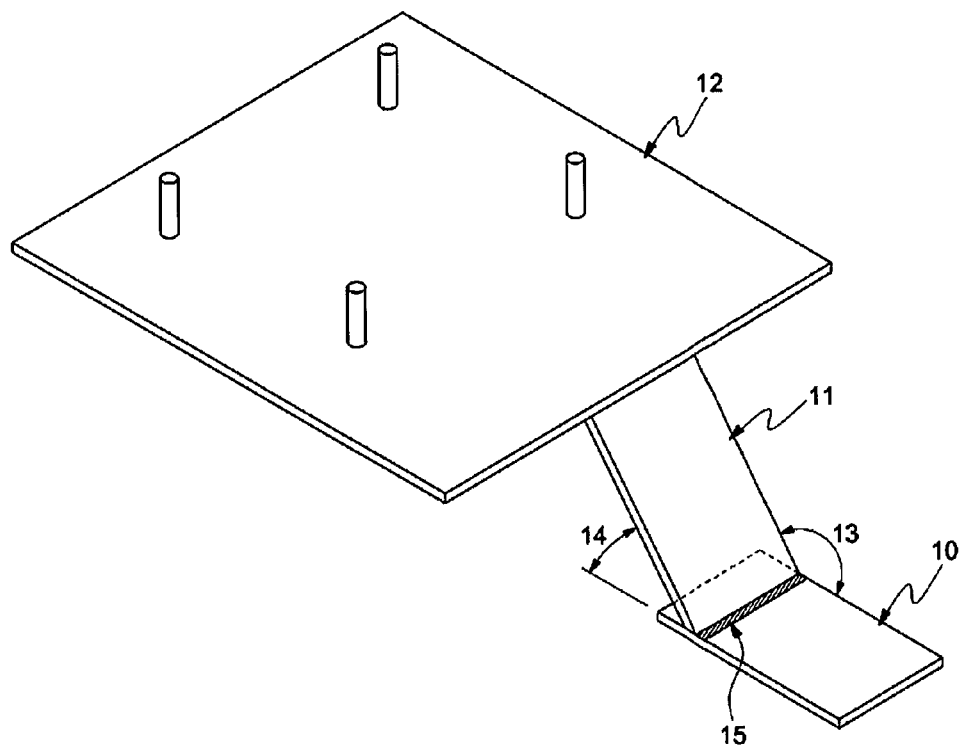
FIG. 1 is a mimetic diagram showing a production method for graphene thin film according to one exemplary embodiment of the present invention.

FIG. 1 is a mimetic diagram showing a production method for graphene thin film according to one exemplary embodiment of the present invention. As illustrated in FIG. 1, the production method for graphene thin film according to the present invention includes: (a) injecting a graphene oxide solution 15 in the direction of an obtuse or acute angle 13 between a substrate 10 placed in parallel with a reciprocating linear motion device 12 and a deposition plate 11 connected to the reciprocating linear motion device 12 and in contact with the substrate 10; and (b) using the reciprocating linear motion device 12 to put the deposition plate 11 connected to the reciprocating linear motion device 12 into reciprocating linear motion while the deposition plate 11 is in contact with the substrate 10 so that the graphene oxide solution 15 can be applied onto the substrate 10.

In accordance with the production method of the present invention, the step (a) can be first performed for the purpose of fabricating a graphene thin film, where the step (a) involves injecting the graphene oxide solution in the direction of an obtuse or acute angle between the substrate placed in parallel with the reciprocating linear motion device and the deposition plate connected to the reciprocating linear motion device and in contact with the substrate.

In the step (a), when the graphene oxide solution is injected in the direction of an obtuse or acute angle between the substrate and the deposition plate in contact with each other, a capillary action renders the graphene oxide solution sucked up in the direction of the acute angle between the substrate and the deposition plate. The graphene oxide solution sucked up in the direction of the acute angle between the substrate and the deposition plate in contact with each other can form a meniscus between the substrate and the deposition plate and a wet film on the surface of the substrate.

The reciprocating linear motion device available in the step (a) of the present invention is not specifically limited in its type and may include any device capable of producing a reciprocating linear motion at a constant speed.

The substrate available in the step (a) of the present invention is not specifically limited in its type and preferably includes at least one selected from the group consisting of a glass substrate, a polymer film, and a silicon wafer.

The glass substrate as used herein is not specifically limited in its type and may include any glass substrate generally used in the related art without limitation.

The polymer film as used herein is also not specifically limited and may include at least one selected from the group consisting of, for example, a polyester film, a polyethylene film, a polyethylene terephthalate film, a polypropylene film, a polydimethylsiloxane film, a poly-4-vinylphenol film, a polymethyl methacrylate film, a polyvinylidene fluoride film, a polystyrene film, a polycarbonate film, a polyimide film, a cellulose film, a polyvinyl chloride film, a polytetrafluoroethylene film, a polyvinyl alcohol film, and a polyurethane film. Preferably, the polymer film may be a polyethylene film or a polydimethylsiloxane film.

The deposition plate available in the step (a) of the present invention is not specifically limited in its type and preferably includes a glass plate or a plastic plate.

The glass plate or the plastic plate is not specifically limited in its type and may be selected properly depending on the desired size of the graphene thin film. This makes it possible to fabricate a large-area graphene thin film.

The size of the substrate and the deposition plate used in the step (a) of the present invention is not specifically limited and may be appropriately determined depending on a desired size of the graphene thin film. This allows the production of a large-area graphene thin film.

In the production method of the present invention, the acute angle between the substrate and the deposition plate in contact with each other is less than 90, preferably 10° to 60°, more preferably 15° to 45°. The acute angle less than 10° leads to a failure to put the deposition plate into reciprocating linear motion and deterioration in the quality of the graphene thin film formed on the substrate. The acute angle greater than 60° possibly makes it difficult to inject the graphene oxide solution in the direction of the obtuse or acute angle between the substrate and the deposition plate in contact with each other and deteriorates the quality of the graphene thin film formed on the substrate.

In the production method of the present invention, the acute angle between the substrate and the deposition plate in contact with each other can be controlled to regulate the thickness of the graphene thin film and hence the transmittance and the sheet resistance of the graphene thin film in a desired range.

The volume of the graphene oxide solution injected in the step (a) is in the range of 5 µl to 100 µl per inch (length) of a contact interface between the substrate and the deposition plate in contact with each other. When the volume of the graphene oxide solution injected in the step (a) is less than 5 µl per inch (length) of the contact interface, the graphene oxide solution possibly vaporizes during its coating process. When the volume of the graphene oxide solution injected in the step (a) is greater than 100 µl per inch (length) of the contact interface, formation of the meniscus and the wet film from the graphene oxide solution cannot be uniform to cause deterioration in the quality of the graphene thin film formed on the substrate.

The concentration of the graphene oxide solution injected in the step (a) is in the range of 0.1 mg/ml to 10 mg/ml. When the concentration of the graphene oxide solution injected in the step (a) is less than 0.1 mg/ml, a large number of reciprocating linear motions of the deposition plate is required in order to form a uniform graphene thin film on the substrate, retarding the coating process time. When the concentration of the graphene oxide solution injected in the step (a) is greater than 10 mg/ml, the graphene oxide flakes in the graphene oxide solution aggregate, which leads to deterioration in the quality of the graphene thin film.

The production method of the present invention may include the step (b) in order to prepare a graphene thin film. The step (b) is using the reciprocating linear motion device to put the deposition plate connected to the reciprocating linear motion device into reciprocating linear motion while the deposition plate is in contact with the substrate, and thereby applying the graphene oxide solution onto the substrate.

The step (a) of the present invention forms a meniscus of the graphene oxide solution between the substrate and the deposition plate and a wet film on the substrate. Subsequent to the step (a), the step (b) uses the reciprocating linear motion device to put the deposition plate connected to the reciprocating linear motion device into reciprocating linear motion while the substrate and the deposition plate are in contact with each other. This can make the meniscus of the graphene oxide solution move in the motion direction of the deposition plate and cause a linear shear gradient in the wet film formed on the substrate, so the graphene oxide flakes in the meniscus become aligned and slanted in the moving direction of the meniscus by the shear force. Accordingly, the graphene oxide flakes in the meniscus are stuck on the substrate in the plate form. Further, the number of reciprocating linear motions of the deposition plate, that is, the reciprocating coating frequency increases to have more of the graphene oxide flakes stuck on the substrate. This makes the graphene oxide flakes laminate uniformly and forms a transparent graphene thin film.

Figure 2:
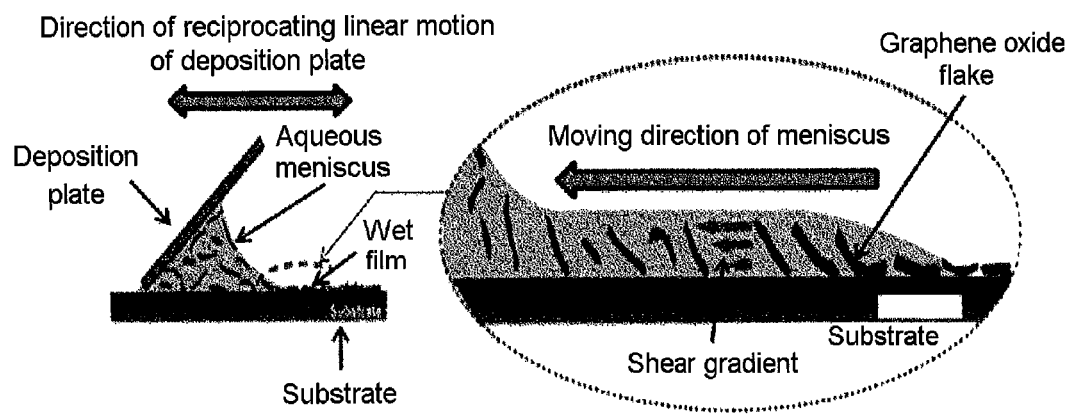
FIG. 2 is a mimetic diagram showing the meniscus of a graphene oxide solution formed between a substrate and a deposition plate and a wet film formed on the substrate.

FIG. 2 is a mimetic diagram showing a meniscus of the graphene oxide solution formed between the substrate and the deposition plate and a wet film formed on the substrate. As illustrated in FIG. 2, when the graphene oxide solution is injected in the direction of the obtuse or acute angle between the substrate and the deposition plate in contact with each other, the capillary action takes place to suck up the graphene oxide solution in the direction of the acute angle between the substrate and the deposition plate to form an aqueous meniscus and a wet film on the substrate. Subsequently, the reciprocating linear motion device is used to put the deposition plate into reciprocating linear motion. This forms a linear shear gradient in the wet film and makes the graphene oxide flakes align in the moving direction of the meniscus under the shear force and stick on the substrate in the plate form. Further, the number of the graphene oxide flakes stuck on the substrate increases with an increase in the number of reciprocating linear motions, that is, the reciprocating coating frequency, thereby forming a graphene thin film uniformly laminated.

In the step (b) of the present invention, when the deposition plate while in contact with the substrate is put into reciprocating linear motion using the reciprocating linear motion device, it is desirable to maintain the angle between the substrate and the deposition plate in contact with each other. If the angle between the substrate and the deposition plate in contact with each other is changed during the reciprocating linear motion of the deposition plate, the radius of the meniscus formed by the graphene oxide solution changes, which leads to a change in the thickness of the wet film and thus makes it difficult to produce a uniform graphene thin film.

In the step (b) of the present invention, the reciprocating linear motion speed of the deposition plate is not specifically limited and may be preferably 1 mm/s or greater. The reciprocating linear motion speed of the deposition plate less than 1 mm/s increases the evaporation of the solution occurring in the meniscus portion of the graphene oxide solution in contact with the substrate and causes precipitation of the graphene oxides, making it difficult to produce a uniform graphene thin film.

The upper limit of the reciprocating linear motion speed of the deposition plate is not specifically limited and may be, for example, 500 mm/s, preferably 100 mm/s, more preferably 40 mm/s. The reciprocating linear motion speed of the deposition plate greater than 500 mm/s increases the thickness of the wet film formed from the graphene oxide solution and causes a large quantity of graphene oxides to suspend, which also makes it difficult to produce a uniform graphene thin film.

In the production method of the present invention, the reciprocating linear motion speed of the deposition plate is controlled in the above-defined range to regulate the thickness of the graphene thin film and hence the transmittance and the sheet resistance of the graphene thin film in a desired range.

In the step (b) of the present invention, the reciprocating coating frequency of the graphene oxide solution by the reciprocating linear motion of the deposition plate is not specifically limited and may be preferably in the range of 1 to 100. The reciprocating coating frequency greater than 100 possibly retards the coating time of the graphene oxide solution and leads to a need for additional injection of the graphene oxide solution due to vaporization of the graphene oxide solution.

The production method for graphene thin film according to the present invention may further include the step (c), which is a step of preparing the graphene oxide solution, prior to the step (a).

In the step (c), the preparation method for the graphene oxide solution is not specifically limited and may be any preparation method commonly used in the related art. Preferably, the graphene oxide solution synthesized by the modified Hummers method using the solution process is centrifugally separated to disperse the graphene oxides uniformly to a thickness of one or two layers. The modified Hummers method using the solution process is well known in the related art.

The production method for graphene thin film according to the present invention may further include the step (d), which is pretreating the substrate, prior to the step (a).

The step (d) eliminates foreign substances from the substrate. The step (d) also provides hydrophilic functional groups for the surface of the substrate so that the graphene oxide solution can form a meniscus between the substrate and the deposition plate and a wet film on the substrate.

If the substrate is a glass substrate or a silicon wafer, the pretreatment process on the substrate in the step (d) involves immersing the substrate in a piranha solution and then washing it with deionized water. More specifically, the substrate is immersed in a piranha solution for 20 minutes to one hour and then washed with deionized water on the surface once or more.

If the substrate is a polymer film, the pretreatment process on the substrate in the step (d) involves conducting a plasma treatment on the substrate.

The production method for graphene thin film according to the present invention may further include the step (e), which is reducing the graphene oxides applied on the substrate to provide electrical conductivity for the graphene thin film, after the step (b).

The step (e) reduces the graphene oxides applied on the substrate to provide electrical conductivity for the graphene thin film.

The reduction process on the graphene oxides applied on the substrate is not specifically limited and may be any reduction process commonly used in the related art.

More specifically, in the present invention, the substrate coated with the graphene oxides is put on a glass Petri-dish, and a mixture of the hydrogen iodide (HI) solution and the acetic acid solution is added to the glass Petri-dish carefully so as not to be in direct contact with the substrate coated with the graphene oxides. The glass Petri-dish is sealed up and then heated to reduce the graphene oxides applied on the substrate.

The volume ratio of the hydrogen iodide (HI) solution and the acetic acid solution is not specifically limited, but preferably in the range from 1:1 to 1:9. The volume ratio of the hydrogen iodide (HI) solution and the acetic acid solution controlled within the above-defined range can reduce the graphene oxides applied on the substrate while using a reduced amount of the hydrogen iodide that is harmful to the human body.

The heating means for the glass Petri-dish is not specifically limited and may be any heating means commonly used in the related art. In the present invention, examples of the heating means may include, but are not limited to, a hot plate or an oven.

The heating temperature and the heating time for the glass Petri-dish are not specifically limited and may be appropriately selected in a defined range required to the reduction of the graphene oxides applied on the substrate.

In the production method for graphene thin film according to the present invention, the step (e) is conducted to reduce the graphene oxides applied to the substrate, thereby producing a graphene thin film having electrical conductivity.

The production method for graphene thin film according to the present invention involves applying the graphene oxide solution directly to the substrate by coating, so it can form a graphene thin film on different substrates without a need for conducting a separate transferring process.

The present invention is also directed to a transparent electrode including the graphene thin film produced by the production method for graphene thin film according to the present invention.

The transparent electrode according to the present invention includes the graphene thin film produced by the production method for graphene thin film according to the present invention.

The graphene thin film produced by the above-described production method for graphene thin film according to the present invention satisfies the general requirements to transparent electrodes, such as sheet resistance and transmittance, and has good flexibility, so it can be suitably used as a transparent electrode.

The structure and the production method for the transparent electrode of the present invention are not specifically limited and may include the structure and the production method commonly used in the related art, as long as the transparent electrode includes the graphene thin film produced by the production method for graphene thin film according to the present invention.

MODES FOR CARRYING OUT THE INVENTION

Hereinafter, a further detailed description will be given as to the present invention with reference to examples, which are not intended to limit the scope of the present invention.

Example 1

Preparation of Graphene Oxide Solution

The graphene oxide solution synthesized by the modified Hummers method using the solution process was subjected to spin-down in a centrifugal separator (WiseSpin CF-10) at 8,000 rpm for 10 minutes to uniformly disperse aggregating graphene oxide flakes to a thickness of one or two layers, thereby preparing a graphene oxide solution. The concentration of the graphene oxide solution was 2.4 mg/ml.

Pretreatment for Substrate

A sulfuric acid solution (95 wt %) and a hydrogen peroxide solution (30 wt %) were mixed at a volume ratio of 1:1 to prepare a piranha solution. A glass substrate was immersed in the piranha solution for 30 minutes and taken out. Deionized water was used to wash the surface of the substrate several times. This eliminated foreign substances from the surface of the substrate and provided hydrophilic functional groups for the surface of the substrate.

Injection of Graphene Oxide Solution

As illustrated in FIG. 1, the pretreated glass substrate was placed in parallel with a reciprocating linear motion device (AL-1515-3S, manufactured by Micro Motion Technology). Then, a glass deposition plate connected to the reciprocating linear motion device was placed on the glass substrate to be in contact with the glass substrate at an acute angle of 30° with the glass substrate. The graphene oxide solution was then injected by way of a micropipette in the direction of the obtuse angle between the glass substrate and the glass deposition plate in contact with each other. The volume of the graphene oxide solution injected was 40 µl per inch (length) of a contact interface between the substrate and the deposition plate.

Coating with Graphene Oxide Solution Using Reciprocating Linear Motion of Deposition Plate The glass deposition plate connected to the reciprocating linear motion device was put in contact with the glass substrate to maintain an acute angle of 30° with the glass substrate. Meanwhile, the reciprocating linear motion device was used to put the glass deposition plate into reciprocating linear motion at 10 mm/sec to apply the graphene oxide solution onto the glass substrate 20 times.

Reduction Treatment on Substrate Coated with Graphene Oxide Solution

The glass substrate coated with the graphene oxide solution was put in a glass Petri-dish. 1 ml in a mixture of the hydrogen iodide (HI) solution (55 wt %) and the acetic acid solution (99.7 wt %) at volume ratio of 2:5 was added to the glass Petri-dish carefully so as not to be in direct contact with the glass substrate coated with the graphene oxides. The glass Petri-dish was sealed up and then heated on a hot plate at 80° C. for 3 hours to reduce the graphene oxides applied on the substrate, thus forming a graphene thin film.

Examples 2 to 8

The procedures were performed in the same manner as described in Example 1, excepting that in the step of applying the graphene oxide solution using the reciprocating linear motion of the deposition plate, the number of reciprocating linear motions of the deposition plate, that is, the reciprocating coating frequency of the graphene oxide solution was varied as 1 (Example 2), 5 (Example 3), 10 (Example 4), 40 (Example 5), 60 (Example 6), 80 (Example 7), and 100 (Example 8).

Examples 9 to 12

The procedures were performed in the same manner as described in Example 1, excepting that in the step of preparing the graphene oxide solution, the concentration of the graphene oxide solution was varied as 0.6 mg/ml (Example 9), 1.2 mg/ml (Example 10), 3.0 mg/ml (Example 11), and 4.0 mg/ml (Example 12).

Examples 13 and 14

The procedures were performed in the same manner as described in Example 1, excepting that in the step of injecting the graphene oxide solution, the acute angle between the glass substrate and the glass deposition plate in contact with each other was varied as 18° (Example 13) and 42° (Example 14).

Examples 15 and 16

The procedures were performed in the same manner as described in Example 1, excepting that in the step of applying the graphene oxide solution using the reciprocating linear motion of the deposition plate, the reciprocating linear motion speed of the deposition plate was varied as 1.6 mm/sec (Example 15) and 30 mm/sec (Example 16).

Example 17

The procedures were performed in the same manner as described in Example 1, excepting that in the step of conducting a pretreatment on the substrate, a polyethylene film was used in place of the glass substrate.

Example 18

The procedures were performed in the same manner as described in Example 1, excepting that in the step of conducting a pretreatment on the substrate, a polydimethylsiloxane (PDMS) film was used in place of the glass substrate.

Example 19

The procedures were performed in the same manner as described in Example 1, excepting that in the step of conducting a pretreatment on the substrate, a silicon wafer was used in place of the glass substrate.

Experimental Example 1

Thickness Measurement of Graphene Thin Film

The graphene thin films prepared in Examples 1 to 12 were measured in regards to the thickness using an atomic force microscope (AFM; PSIA XE-100).

Figure 3:
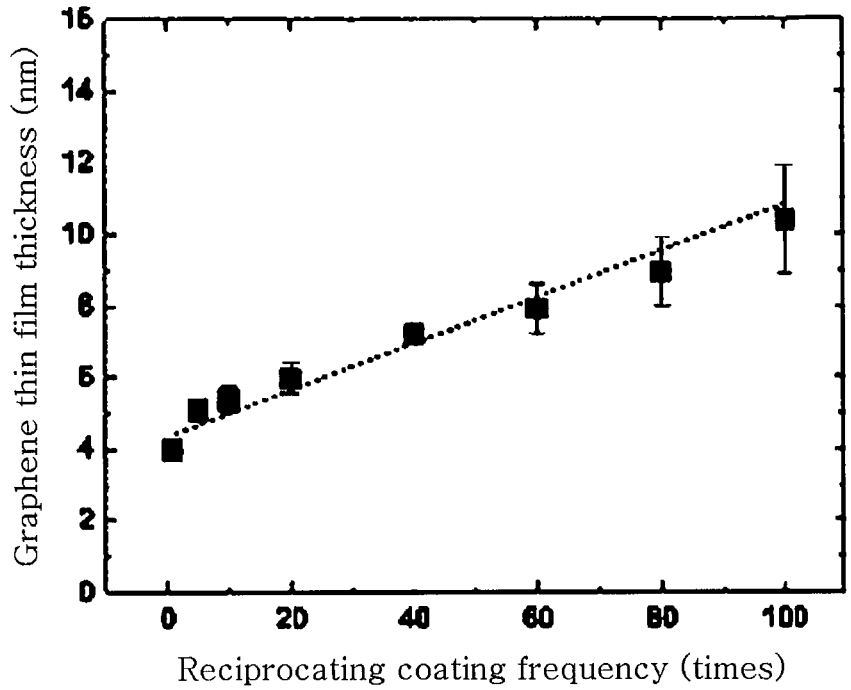
FIG. 3 is a graph showing the thickness of the graphene thin film as a function of the reciprocating coating frequency of the graphene oxide solution.

FIG. 3 is a graph showing the thickness of the graphene thin film as a function of the reciprocating coating frequency of the graphene oxide solution. In Examples 1 to 8, the only one condition changed in the fabrication of a graphene thin film was the reciprocating coating frequency of the graphene oxide solution. As can be seen from FIG. 3, the thickness of the graphene thin film was in linear proportion to the reciprocating coating frequency under the condition that the concentration of the graphene oxide solution was constant.

Figure 4:
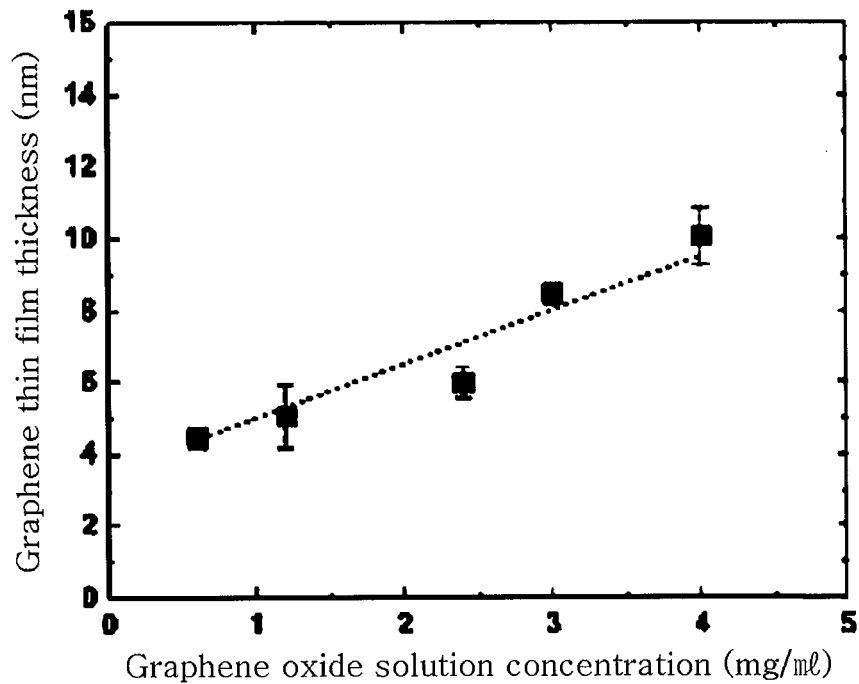
FIG. 4 is a graph showing the thickness of the graphene thin film as a function of the concentration of the graphene oxide solution.

FIG. 4 is a graph showing the thickness of the graphene thin film as a function of the concentration of the graphene oxide solution. In Examples 1 and 9 to 12, the only one condition changed in the fabrication of a graphene thin film was the concentration of the graphene oxide solution. As can be seen from FIG. 4, the thickness of the graphene thin film was in linear proportion to the concentration of the graphene oxide solution under the condition that the reciprocating coating frequency of the graphene oxide solution was constant.

As can be seen from FIGS. 3 and 4, the production method for graphene thin film according to the present invention can control the thickness of the graphene thin film on a nanometer scale as a function of the reciprocating coating frequency and the concentration of the graphene oxide solution. In other words, the production method for graphene thin film according to the present invention can regulate the thickness of the graphene thin film on a nanometer scale by way of the variables easily controllable, such as the reciprocating coating frequency and the concentration of the graphene oxide solution.

Experimental Example 2

Measurement of Transmittance and Sheet Resistance of Graphene Thin Film

The graphene thin films prepared in Examples 1 and 5 to 16 were measured in regards to the transmittance at a wavelength of 550 nm using a UV spectrometer (Jasco V-670). The graphene thin films prepared in Examples 1 and 5 to 16 were also measured in regards to the sheet resistance according to the 4-probe method (Keithley 2400 Source Meter).

Figure 5:
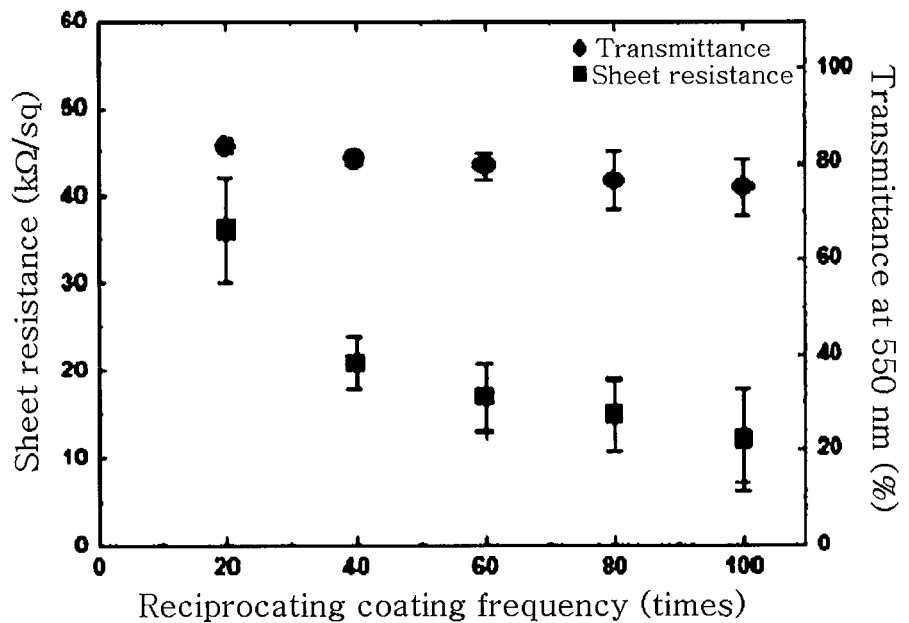
FIG. 5 is a graph showing the transmittance and the sheet resistance of the graphene thin film as a function of the reciprocating coating frequency of the graphene oxide solution.

FIG. 5 is a graph showing the transmittance and the sheet resistance of the graphene thin film as a function of the reciprocating coating frequency of the graphene oxide solution. In Examples 1 and 5 to 8, the only one condition changed in the fabrication of a graphene thin film was the reciprocating coating frequency of the graphene oxide solution. As can be seen from FIG. 5, the transmittance and the sheet resistance of the graphene thin film decreased with an increase in the reciprocating coating frequency under the condition that the concentration of the graphene oxide solution was constant.

Figure 6:
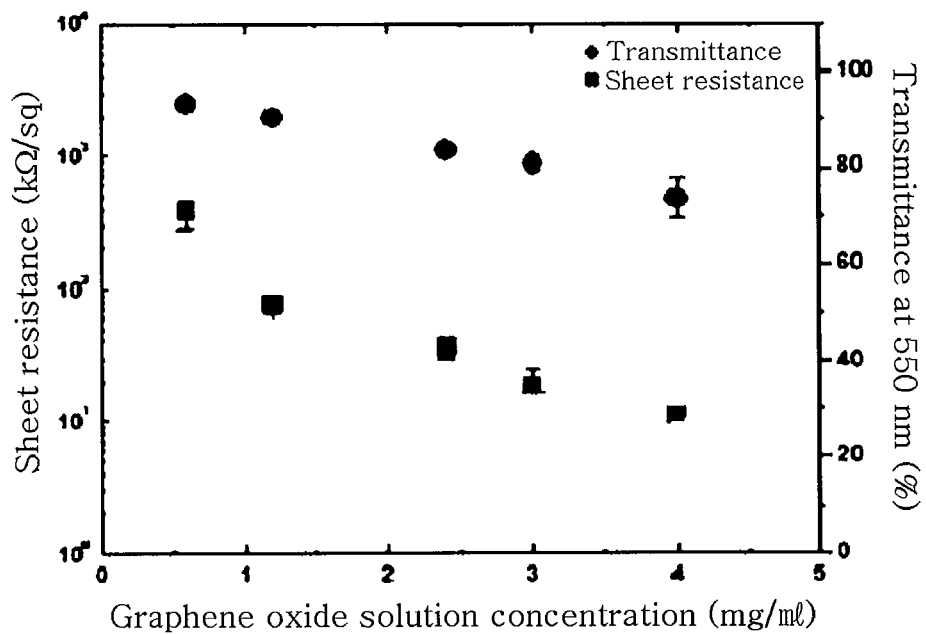
FIG. 6 is a graph showing the transmittance and the sheet resistance of the graphene thin film as a function of the concentration of the graphene oxide solution.

FIG. 6 is a graph showing the transmittance and the sheet resistance of the graphene thin film as a function of the concentration of the graphene oxide solution. In Examples 1 and 9 to 12, the only one condition changed in the fabrication of a graphene thin film was the concentration of the graphene oxide solution. As can be seen from FIG. 6, the transmittance and the sheet resistance of the graphene thin film decreased with an increase in the concentration of the graphene oxide solution under the condition that the reciprocating coating frequency of the graphene oxide solution was constant.

Figure 7:
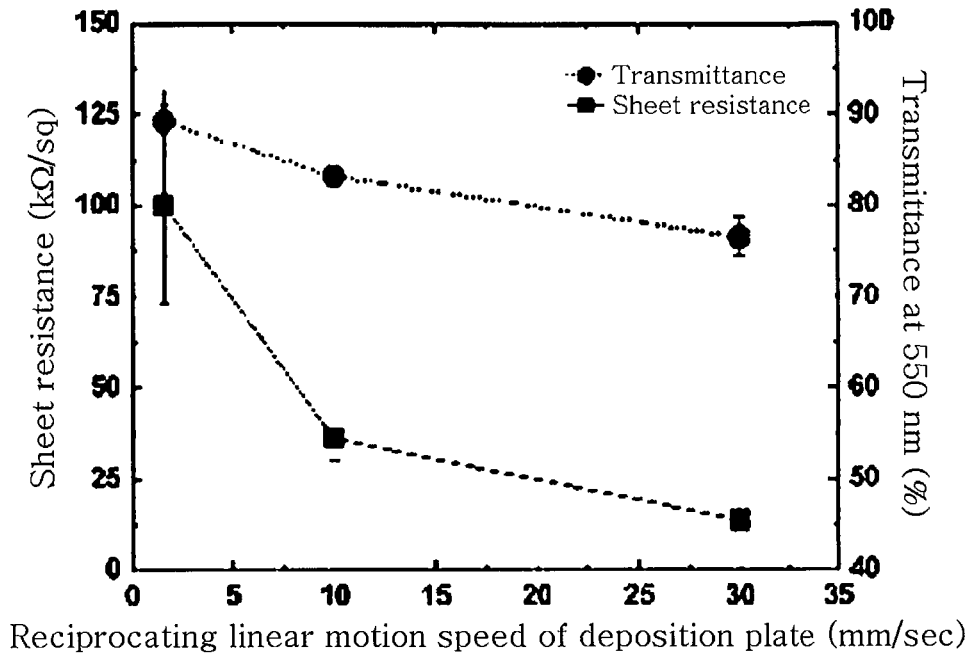
FIG. 7 is a graph showing the transmittance and the sheet resistance of the graphene thin film as a function of the reciprocating linear motion speed of the deposition plate.

FIG. 7 is a graph showing the transmittance and the sheet resistance of the graphene thin film as a function of the reciprocating linear motion speed of the deposition plate. In Examples 1, 15 and 16, the only one condition changed in the fabrication of a graphene thin film was the reciprocating linear motion speed of the deposition plate. As can be seen from FIG. 7, the transmittance and the sheet resistance of the graphene thin film decreased with an increase in the reciprocating linear motion speed of the deposition plate.

Figure 8:
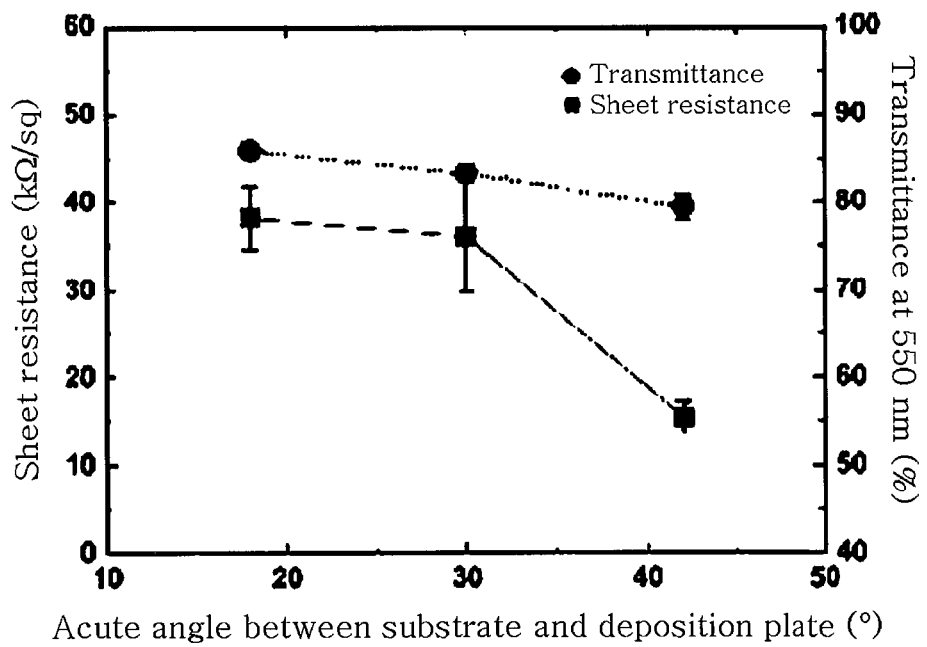
FIG. 8 is a graph showing the transmittance and the sheet resistance of the graphene thin film as a function of the acute angle between the substrate and the deposition plate.

FIG. 8 is a graph showing the transmittance and the sheet resistance of the graphene thin film as a function of the acute angle between the substrate and the deposition plate. In Examples 1, 13 and 14, the only one condition changed in the fabrication of a graphene thin film was the acute angle between the substrate and the deposition plate. As can be seen from FIG. 8, the transmittance and the sheet resistance of the graphene thin film decreased with an increase in the acute angle between the substrate and the deposition plate.

It can be seen from FIGS. 3 to 6 that the transmittance and the sheet resistance of the graphene thin film were intimately related with the thickness of the graphene thin film. In other words, the transmittance and the sheet resistance of the graphene thin film decreased with an increase in the thickness of the graphene thin film.

In addition, it can be seen from FIGS. 7 and 8 that an increase in the reciprocating linear motion speed of the deposition plate increased the thickness of the graphene thin film and thus decreased the transmittance and the sheet resistance of the graphene thin film; and that an increase in the acute angle between the substrate and the deposition plate increased the thickness of the graphene thin film and thus decreased the transmittance and the sheet resistance of the graphene thin film.

In conclusion, the production method for graphene thin film according to the present invention can control the thickness of the graphene thin film by regulating, among the fabrication conditions, not only the reciprocating coating frequency and the concentration of the graphene oxide solution but also the reciprocating linear motion speed of the deposition plate and the acute angle between the substrate and the deposition plate. Finally, this can control the optical and electrical properties of the graphene thin film. In other words, the production method for graphene thin film according to the present invention can produce a graphene thin film having optical and electrical properties required to a transparent electrode by controlling various conditions of the fabrication.

Therefore, the production method for graphene thin film according to the present invention can use a smaller amount of the graphene oxide solution than the conventional production methods for graphene thin film to prepare a graphene thin film having optical and electrical properties equivalent or better and produce a uniform and large-area graphene thin film in a short process time.

Experimental Example 3

Picture of Graphene Thin Film

The pictures of the graphene thin films prepared in Examples 1 and 17 to 19 were taken with a digital camera.

Figure 9:
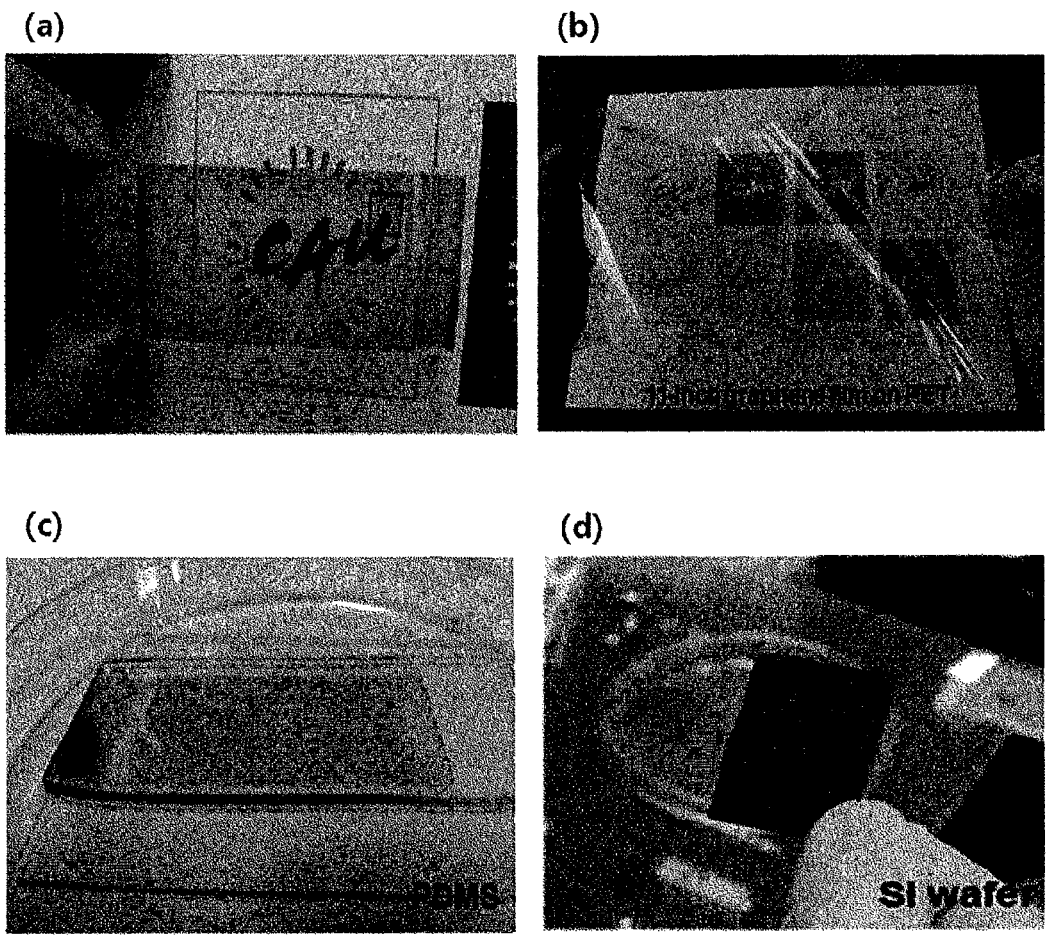
FIG. 9 shows pictures of graphene thin films prepared in Examples 1, 17, 18 and 19.

FIG. 9 shows the pictures of graphene thin films prepared in Examples 1 and 16 to 18. As can be seen from FIG. 9, the graphene thin film (a) formed on a glass substrate, the graphene thin film (b) on a polyethylene film, the graphene thin film (c) on a polydimethylsiloxane (PDMS) film, and the graphene thin film (d) on a silicon (Si) wafer demonstrated that the production method for graphene thin film according to the present invention could produce a graphene thin film directly on different substrates, thus eliminate a need for the separate transferring process, and allow the graphene thin film formed on a flexible substrate to be used as a flexible transparent electrode.

10: Substrate
11: Deposition plate
12: Reciprocating linear motion device
13: Obtuse angle between substrate and deposition plate
14: Acute angle between substrate and deposition plate
15: Graphene oxide solution

What is claimed is:

1. A production method for graphene thin film comprising the steps of:
   (a) injecting a graphene oxide solution in a direction of an obtuse or acute angle between a substrate placed in parallel with a reciprocating linear motion device and a deposition plate connected to the reciprocating linear motion device and in contact with the substrate;
   (b) using the reciprocating linear motion device to put the deposition plate connected to the reciprocating linear motion device into reciprocating linear motion while the deposition plate is in contact with the substrate, thereby applying the graphene oxide solution onto the substrate;

(c) preparing the graphene oxide solution, prior to the step (a);
(d) pretreating the substrate, prior to the step (a); and
(e) reducing the substrate coated with the graphene oxide solution using a reducing agent, after the step (b);
wherein the acute angle between the substrate and the deposition plate is 10° to 60°,
wherein a volume of the graphene oxide solution injected in the step (a) is 5 μl to 100 μl per inch (length) of a contact interface between the substrate and the deposition plate,
wherein a concentration of the graphene oxide solution injected in the step (a) is 0.1 mg/ml to 10 mg/ml,
wherein a reciprocating linear motion speed of the deposition plate in the step (b) is 1 mm/s or greater,
wherein a reciprocating coating frequency of the graphene oxide solution in the step (b) is 1 to 100.

2. The production method for graphene thin film as claimed in claim 1, wherein the substrate is at least one selected from the group consisting of a glass substrate, a polymer film, and a silicon wafer.

3. The production method for graphene thin film as claimed in claim 2, wherein the polymer film is at least one selected from the group consisting of a polyester film, a polyethylene film, a polyethylene terephthalate film, a polypropylene film, a polydimethylsiloxane film, a poly-4-vinylphenol film, a polymethyl methacrylate film, a polyvinylidene fluoride film, a polystyrene film, a polycarbonate film, a polyimide film, a cellulose film, a polyvinyl chloride film, a polytetrafluoroethylene film, a polyvinyl alcohol film, and a polyurethane film.

4. The production method for graphene thin film as claimed in claim 1, wherein the deposition plate is a glass plate or a plastic plate.

5. The production method for graphene thin film as claimed in claim 1, wherein the step (c) is performed by centrifugally separating the graphene oxide solution synthesized by a modified Hummers method using a solution process to uniformly disperse graphene oxide to a thickness of one or two layers.

6. The production method for graphene thin film as claimed in claim 1, wherein the step (d) is performed by immersing the substrate in a piranha solution and then washing with deionized water.

7. The production method for graphene thin film as claimed in claim 1, wherein the step (d) is performed by subjecting the substrate to plasma treatment.

* * * * *